United States Patent [19]

Miller

[11] 4,419,830

[45] Dec. 13, 1983

[54] BORE GAUGE HEAD ASSEMBLY

[75] Inventor: Mark H. Miller, Johnston, R.I.

[73] Assignee: Federal Products Corporation, Providence, R.I.

[21] Appl. No.: 356,947

[22] Filed: Mar. 11, 1982

Related U.S. Application Data

[63] Continuation-in-part of Ser. No. 288,985, Jul. 31, 1981.

[51] Int. Cl.³ .............................................. G01B 5/12
[52] U.S. Cl. .............................. 33/178 R; 33/147 K
[58] Field of Search ............. 33/178 R, 178 E, 147 K, 33/147 N, 149 J, 143 L

[56] References Cited

U.S. PATENT DOCUMENTS

| | | | |
|---|---|---|---|
| 1,452,780 | 4/1923 | Beard | 33/178 R |
| 2,451,419 | 10/1948 | Vinyard | 33/164 C |
| 2,930,134 | 3/1960 | Bishop et al. | 33/178 R |
| 3,442,020 | 5/1969 | Worthen | 33/178 R |
| 4,170,831 | 10/1979 | Olasz | 33/178 R |

Primary Examiner—Willis Little
Attorney, Agent, or Firm—Morse, Altman & Dacey

[57] ABSTRACT

A head assembly is provided for use in a bore gauge and is adapted to actuate either a mechanical readout, such as a dial indicator, or an electrical readout, such as a linear varible differential transformer connected to a digital display. A U-shaped centralizing arm pivoted to the body of the head assembly is provided with a pair of floating centralizing ball contacts. A first measuring ball contact is mounted at the outer end of a threaded extensible stem bearing a graduated scale and adapted to be adjusted as to radial extension. A second sensing ball contact is mounted for adjustment on a resiliently mounted finger which drivingly engages a transfer rod. The transfer rod is operatively connected to the readout device whether a dial indictor or LVDT. A ball and groove driving arrangement is provided between the transfer rod and the pivotal finger.

9 Claims, 10 Drawing Figures

BORE GAUGE HEAD ASSEMBLY

CROSS-REFERENCE TO RELATED APPLICATION

This is a continuation-in-part of U.S. application Ser. No. 288,985 filed July 31, 1981, entitled "Head For Bore Gauge," pending.

BACKGROUND OF THE INVENTION

1. Field of the Invention

This invention relates generally to measuring instruments and more particularly is directed towards a new and improved bore guage head assembly for use with a mechanical or electronic read-out device such as a dial indicator or a digital display coupled to an LVDT, for example.

2. Description of the Prior Art

A bore gauge is an instrument designed to measure inside diameters of a cylindrical bore formed in a variety of different workpieces. By way of example, a machinist drilling or cutting a bore in a workpiece will normally perform frequent precise measurements of the diameter of the bore to ensure that the finished diameter corresponds with specifications. While calipers can be used for this purpose, bore gauges are more convenient and quicker to use. A typical bore gauge used for this purpose is provided with a head having a pair of angularly spaced centralizing contacts, one on either side of a centerline perpendicular to the longitudinal axis of the instrument. At one end of the centerline is an extensible stem and at the opposite end is a sensing contact. The centralizing contacts and the stem serve to position the head so that the centerline is located precisely along the diameter of the bore. In that position the sensing contact, which can move within a limited range of motion, can make a measurement precisely at the diameter of the bore. The sensing contact is operatively connected to a mechanism which drives a dial indicator, LVDT or the like.

Since the sensing contact of a bore gauge typically has relatively small range of motion, the effective measurement range of the instrument can be increased or decreased by providing an extensible stem directly opposite the sensing contact of the gauge head. Such stems heretofore have been in the form of plain screws that are turned in or out as required with particular settings being established by inserting the head of a bore gauge in a reference ring selected to correspond approximately with the diameter of the bore to be measured. Once the bore gauge has been set in the reference ring, the head of the instrument is then inserted in the bore itself and the reading is made, typically on a dial indicator mechanically connected to the measuring head.

While this type of instrument is known in the art as exemplified by the following U.S. Pat. Nos. 3,418,720, 3,442,020, 3,422,540, 4,030,202 and 4,170,831, these instruments have been somewhat difficult to operate and maintain. For example, the initial setting of the extensible stem is quite slow and may require several adjustments before the stem is correctly extended and locked.

In the above identified parent application there are various improvements in bore gauges, these improvements including a stem which is adjusted by means of a rack and pinion drive, floating ball contacts which bear directly against flat faces of the center part of the head and the bore wall during a centralizing manipulation of the instrument and an improved motion between the sensing contact and a transfer rod which drivingly connects with a dial indicator or the like.

It is an object of the present invention to provide further improvements in head assemblies for bore gauges.

A more specific object of this invention is to provide a bore gauge head assembly of simple, rugged construction adapted for hard use without impairing the operation thereof.

Another object of this invention is to provide a head assembly for a bore gauge in which a ball contact serving as the sensing contact may be easily replaced or adjusted. Still another object of this invention is to provide a bore gauge head assembly in which the stem is easily adjusted and provides a direct reading of the stem position.

Still another object of this invention is to provide a bore gauge head assembly which is substantially tamper proof.

SUMMARY OF THE INVENTION

This invention features a head assembly for a bore gauge comprising a body portion adapted to be attached to a dial indicator or the like and containing a linearly moveable transfer rod drivingly connected to the dial indicator at one end and at the other end drivingly connected to a spring mounted finger hinged to the body portion. The finger carries a sensing ball contact for contacting the work surface such as the inside wall of the bore and a second ball at the inner portion thereof engaging an end of the transfer rod. Movement of the finger about its leaf spring support will result in the arcuate motion of the finger being translated into a linear motion of the transfer rod. The finger is mounted for movement within a cavity formed in the body portion and is limited to a relatively small arc of movement. The sensing ball contact is mounted within a recess and is pressed into place. A set screw in the finger is disposed along the centerline and is adapted to permit adjustment of the ball contact with respect to the finger. A threaded stem is mounted in a tapped passage along the centerline and carries a ball contact on its lower end. The stem is provided with a longitudinal scale to permit direct reading of the stem extension. A face plate on the front of the head provides protection of the head.

DETAILED DESCRIPTION OF THE PREFERRED EMBODIMENTS

Figure 1:
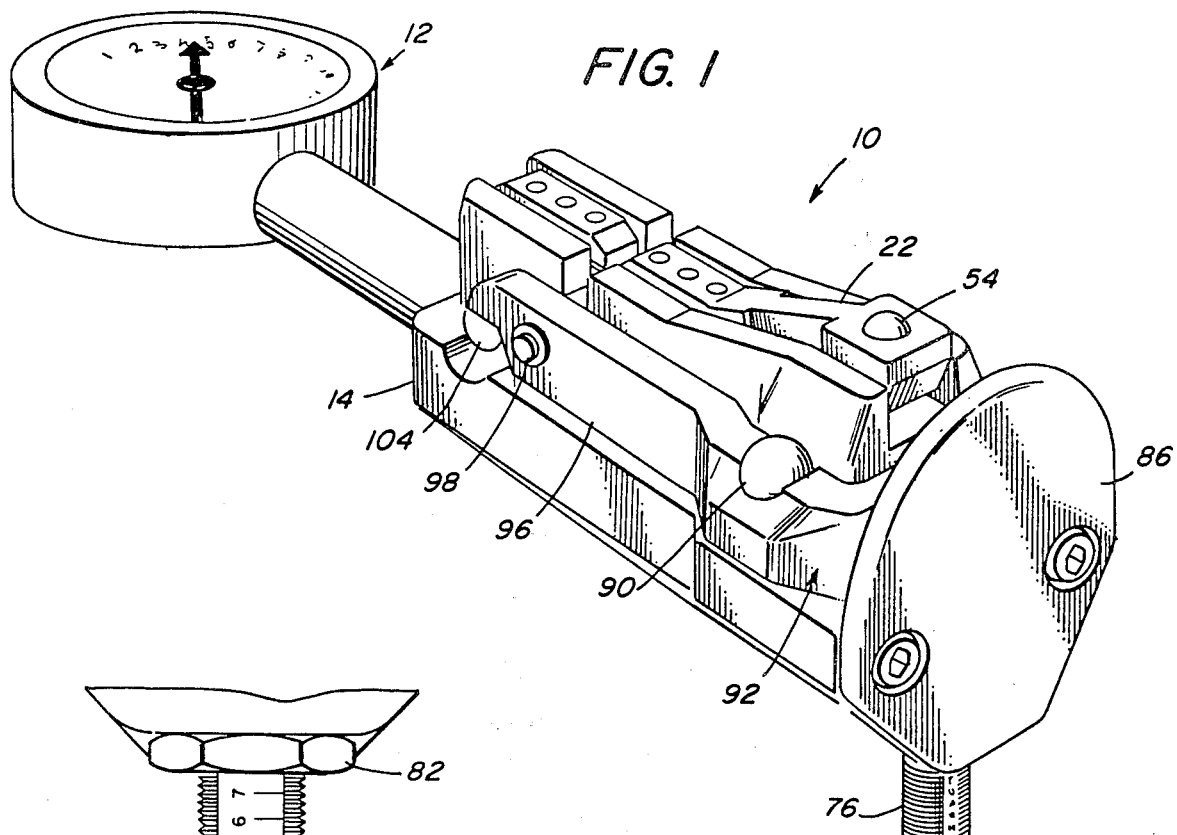
FIG. 1 is a view in perspective showing a bore gauge head made according to the invention and in use with a dial indicator.

Referring now to the drawings, the reference character 10 generally indicates a bore gauge head assembly adapted to be used with a dial indicator 12, as shown in FIG. 1, or with another suitable output device such as a linear variable differential transformer having a digital electronic display as suggested in the parent application. In either event, the head assembly is organized about a body 14, preferably machined from a high grade steel alloy. The body 14 slidably supports a transfer rod 16 which extends out through the left hand end or rear of the body through a coupling 18. The left hand end of the transfer rod is adapted to engage the drive rod of the dial indicator 12 which attaches to the body by means of the coupling 18. Any linear motion of the transfer rod 16 thus causes movement of the needle on the dial indicator and represents a measurement being made by the gauge head.

The body 14 is formed with a central slot-like cavity 20 extending from top to bottom of the body and dimensioned to accommodate a somewhat Tee-shaped finger 22 disposed in the top portion of the cavity and hinged for arcuate movement to the body by means of a flat leaf spring 24. The leaf spring 24 is secured to the left hand or rear upper part of the body 14 by inverted bolts 26 and 28. The heads of these bolts are located within access holes 30 and 32 and the upper ends of the bolts are threaded to a plate 34 clamping against the left hand end of the spring 24. The right hand end of the spring is clamped to a rearward extension 42 of the finger by means of bolts 36 and 38, also inverted and passing through a clamping plate 40 on the lower face of the finger extension 42.

Figure 7:
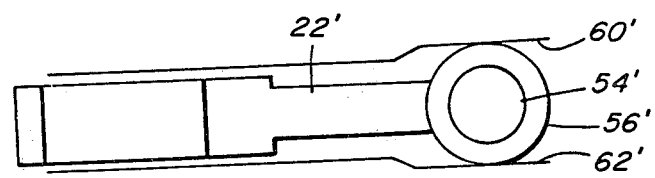
FIG. 7 is a fragmentary top plan view of the hinged finger and sensing contact in a slightly modified version of the invention.
Figure 9:
FIG. 9 is sectional view in side elevation of the set screw used with the sensing contact, and, FIG. 10 is an end view thereof.
Figure 10:
Figure 2:
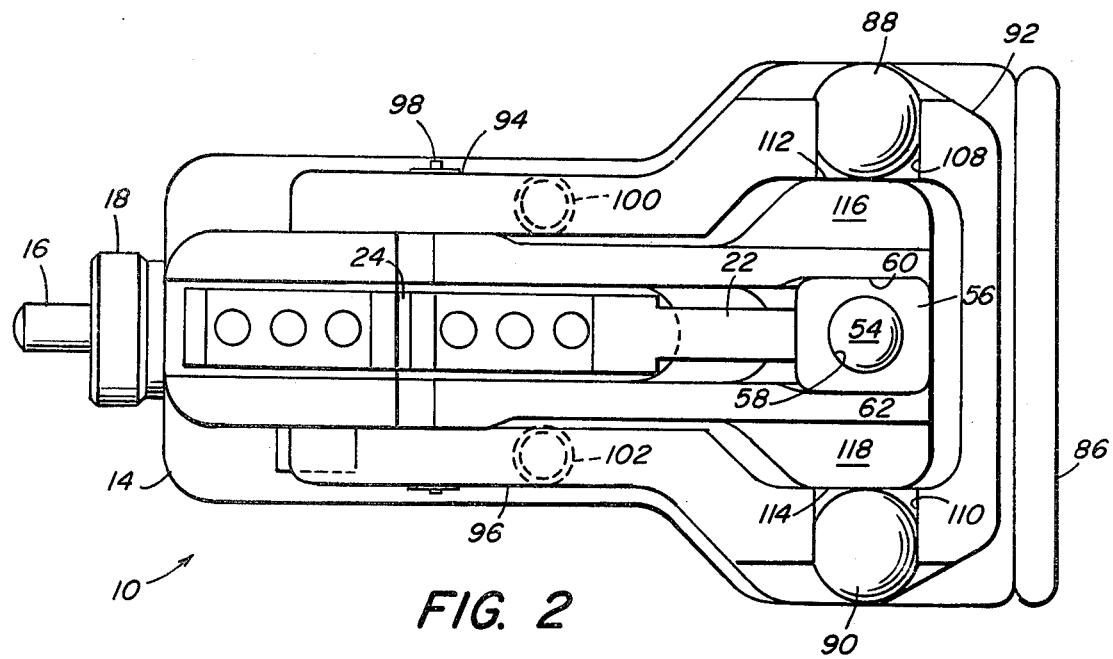
FIG. 2 is a top plan view of the head assembly.
Figure 4:
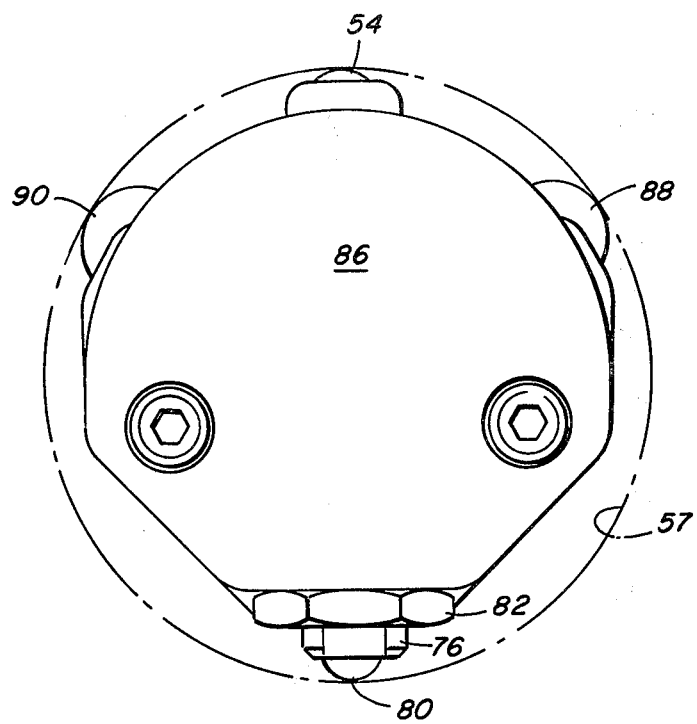
FIG. 4 is a front elevation thereof.

The finger 22 is formed with a downwardly extending leg portion 44 at the lower left hand end of which is a ball contact 46 engaging a diagonal Vee groove 48 formed on the right hand or forward end of the transfer rod 16, as in the parent application. The lower face of the transfer rod 16 is formed with a generally flat portion 50, which may be longitudinally grooved as in the parent application, and which rides against a fixed cross-pin 52 for support. Movement of the finger about the spring hinge 24 will cause an arcuate motion of the finger to be translated into a linear motion of the transfer rod 16. Motion of the finger is provided when a sensing ball contact 54 mounted in a right hand forward extension portion 56 of the finger engages a work surface such as the cylindrical inner wall of a bore 57 as suggested in FIG. 4. The sensing ball contact 54 is pressed into a socket 58 formed in the upper face of the finger extension 56. The extension 56, as best shown in FIG. 2 is dimensioned to fit neatly between the walls of the slot-like cavity 20 formed in the body 14 with very little clearance between the finger portion 56 and side walls 60 and 62 of the body cavity. The finger extension portion 56 may have somewhat flattened walls, as shown in FIG. 2, or they may be somewhat rounded, as suggested in FIG. 7, but, in either event, they should move in closely spaced relation to the walls 60 and 62 so as to minimize any sidewise movement of the finger.

Figure 8:
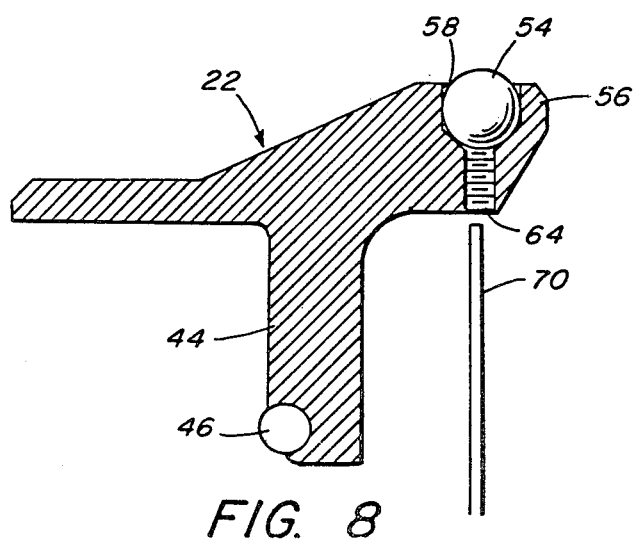
FIG. 8 is a side elevation thereof.

Below the sensing ball contact 54 is a tapped hole 64 in which is mounted an annular set screw 66 having a slot 68 in the lower end. The function of the set screw is to adjust the position of the sensing ball contact 54 with respect to ball contact 46 by inserting a screwdriver, or the like up through the bottom of the instrument, as will be described more fully below. The screwdriver tip can engage the slot 68 of the set screw to turn the set screw one way or the other, as required. Also, since the set screw is annular, a punch 70, as suggested in FIG. 8, may be inserted up through the bottom of the instrument and through the annular set screw to knock out the ball contact 54 when replacing the ball contact without the need of disassembling the instrument.

Figure 3:
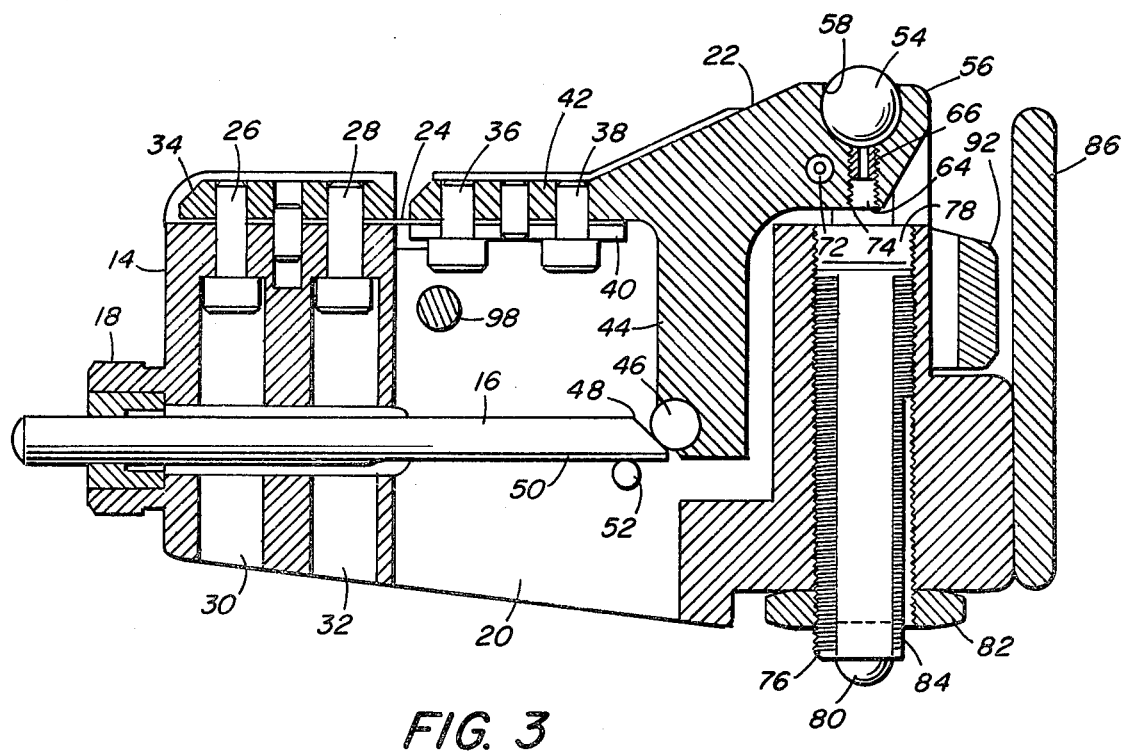
FIG. 3 is sectional view in side elevation thereof.

The motion of the finger within the cavity 20 is limited by means of a relatively small cross pin 72 mounted transversely at its ends in the body portion 14 and extending through a relatively large hole 74 formed transversely through the finger, as best shown in FIG. 3.

Directly below the sensing ball contact 54 is a tubular threaded stem 76 mounted in a tapped hole 78 formed in the body 14. A spherical or hemispherical contact 80 is provided at the lower end of the stem. A lock nut 82 is threaded onto the stem and, when run up against the lower face of the body as shown in FIG. 3, will lock the stem in any selected position. Removal of the stem from the hole 78 will allow the punch 70 shown in FIG. 8 to be inserted to knock out the sensing ball contact or allow the insertion of a screwdriver for adjustment of the sensing contact by turning the set screw 66.

Figure 6:
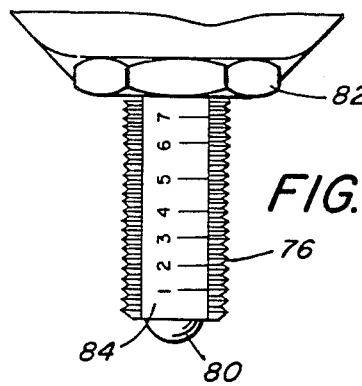
FIG. 6 is a detail side elevation of the adjustable stem.

The function of the threaded stem 76 is to move the contact 80 in or out according to the diameter of the bore that is being measured by the instrument. In practice, the stem is extended to the approximate diameter of the bore and the instrument then inserted in the bore to perform the actual measurement which is determined by the motion of the sensing contact 54. In order to facilitate positioning the extension of the stem, the stem is provided with a graduated scale 84 along a flat face thereof as best shown in FIG. 6. By turning the stem in or out the scale will move along with the stem with a reading being made by the scale lines against the bottom face of the locking nut 82. In practice there should be a logical relationship between the scale markings and the threads on the stem so that each revolution of the stem will advance or retract the stem by a predetermined distance on the scale such as one turn of the stem producing a one, one-half or one-quarter move of each graduation on the scale, for example. With the scale directly on the stem the operator using the instrument can readily determine the stem setting and extend it or retract it as required by a measured amount. This greatly expedites the setting of the instrument for a particular size bore diameter to be measured. Once the stem extension has been set, the locking nut 82 is tightened in place to hold the stem firmly in place during the actual measurement operation.

Mounted to the forward end of the head assembly is a somewhat circular face plate 86 which serves to protect the instrument in use in the event that the head strikes a shoulder or other fixed object in the bore as the instrument is being inserted.

In order to locate the sensing ball contact 54 and the contact 80 precisely along the diameter of the bore, a pair of centralizer ball contacts 88 and 90 are provided, one on either side of the vertical centerline defined by the contacts 54 and 80. The centralizer ball contacts 88 and 90 are carried by a generally U-shaped centralizer arm 92 having a pair of spaced parallel legs 94 and 96 extending lengthwise of the body and pivoted to the body 14 by means of a cross pin 98. The pin 98 extends through both legs and the body 14 to permit the pivoting movement on the centralizer arm 92.

Figure 5:
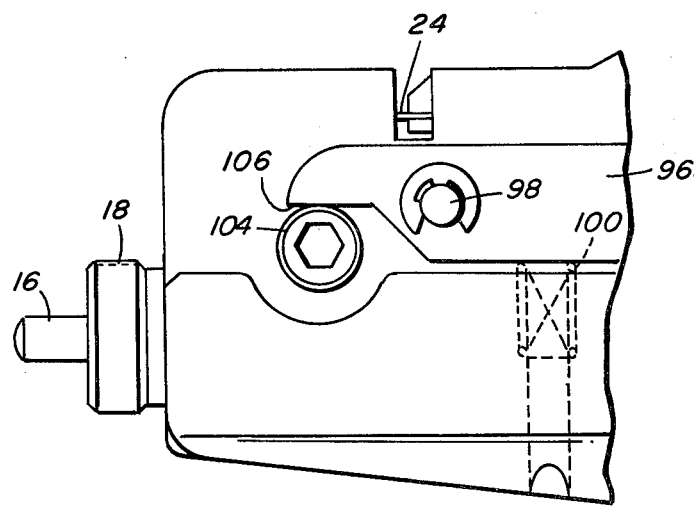
FIG. 5 is a fragmentary side elevation showing details of construction.

The centralizer arm 92 is normally urged in an upward or counterclockwise direction as viewed in FIGS. 3 and 5 by means of a pair of coil springs 100 and 102, or the like, mounted on opposite sides of the body 14 and set in cooperating sockets. The springs engage the lower faces of the legs 94 and 96 forwardly of the pivot pin 98. The upper movement of the centralizer arm 92 is limited by means of a cam stop 104 mounted transversely through the body rearwardly of the pivot pin 98 and engaging a shoulder 106 at the rearward end of each of the legs 94 and 96. The cam stop 104 may be turned in either direction depending upon the extent of arm movement desired. Since the cam can be rotated to a different angular position it will be understood that the effective position of the stop may be changed to thereby change the motion of the centralizer arm 96.

The centralizer balls 88 and 90 are mounted for linear lateral movement within transverse grooves 108 and 110 formed in the forward portion of the centralizer arm and in direct opposite alignment with one another. The grooves are semi-circular and allow the centralizer balls 88 and 90 to move to and away from the body without the balls coming entirely free of the grooves which are restricted at their outer ends. The inner portions of the balls 88 and 90 bear against flat working faces 112 and 114 formed in forward lobes 116 and 118 of the body portion when the balls are snug against the walls of the bore. When the instrument is inserted in the bore and centralized, the contacts 54 and 80 will be precisely located along the diameter of the bore. In practice, the instrument is tipped back and forth until the smallest reading is produced. When the smallest reading is obtained on the dial indicator or the like the true diameter of the bore is read.

While the invention has been described with particular reference to the illustrated embodiments, numerous modifications thereto will appear to those skilled in the art without departing from the invention.

For example, instead of a U-shaped arm pivoted to the body to support the centralizer ball contacts, the ball contacts could be mounted to the outer ends of a spring-loaded slide located in the forward part of the head and adapted to reciprocate in a plane perpendicular to the transfer rod and including the sensing ball contact and the stem contact. The slide could be directly behind the face plate 86 and provided with semi-circular grooves similar to grooves 108 and 110 in the principal embodiment to receive the centralizer balls.

Having thus described the invention, what I claim and desire to obtain by Letters Patent of the United States is:

1. A head for a bore gauge having a movable member therein adapted to produce an indication of measurement corresponding to the extent of displacement of said member, said head comprising:
   (a) a body;
   (b) connecting means for operatively connecting said body to said gauge;
   (c) a transfer rod mounted for limited longitudinal movement in said body and drivingly connected at one end to said member;
   (d) a bore-engaging sensing member movably mounted to the distal end of said body and drivingly connected to the other end of said rod;
   (e) an adjustable bore-engaging element mounted to the distal end of said body on the opposite side of said head in diametrical alignment with said sensing member;
   (f) said body being formed with a tapped hole coaxial with said alignment and a threaded stem disposed in said hole, said element mounted on the outer end thereof whereby rotation of said stem will selectively extend or retract said element diametrically to and away from said body and said sensing member;
   (g) a measurement scale located lengthwise along said stem for visually indicating the extension of said stem from said hole;
   (h) centralizing means connected to said body for engaging the walls of said bore and positioning said sensing member and said element along the diameter of said bore;
   (i) a locking nut mounted to said stem and engageable with said body for locking said stem at a selected position;
   (j) said other end of said transfer rod being formed with a diagonally extending V groove, said sensing member being resiliently and pivotally mounted to said body and including a spherical portion seated in said groove whereby any pivotal movement of said sensing member is converted to a linear movement of said rod; and
   (k) a support member mounted to said body transversely of said rod and engaging said rod along one side thereof adjacent said other end and opposite said groove to provide sliding support for said rod.

2. A head according to claim 1 wherein said rod is formed with a generally flat face along said one side, said face being formed with a longitudinal groove and a pair of spaced parallel narrow longitudinal ribs slidably engaging said support member, and wherein said support member is a rigid cylindrical pin.

3. A head according to claim 1 including a first hard ball contact mounted to said sensing member in position to engage said bore and diametrically opposite said adjustable element and means for adjusting the position of said first ball contact with respect to said sensing member; a second hard ball contact at the outer end of said stem in position to engage said bore and diametrically opposite said first ball contact; and a leaf spring connecting said sensing member to said body, said leaf spring extending generally parallel to said rod and in position to deflect to and away from said rod.

4. A head according to claim 1 wherein said centralizing means includes a U-shaped arm having a pair of parallel legs and a cross portion at one end thereof, pivot means connecting the other end of said legs to said body with said legs extending generally parallel to said rod and along opposite sides of said body and with said cross portion disposed proximate the distal end of said body, spring means between said arm and said body urging said one end of said arm away form said bore engaging element, said arm formed with a groove in each leg thereof at said one end and extending transversely of said legs in alignment with one another, a centralizing ball mounted for limited transverse movement in each of said grooves, each of said centralizing balls having a portion thereof extending outwardly of its respective groove to simultaneously bear against said body and said bore when said head is within said bore, said centralizing balls, said sensing member and said element being disposed in the same plane.

5. A head for a bore gauge having a movable member therein adapted to produce an indication of measurement corresponding to the extent of displacement of said member, said head comprising:

(a) a body;
(b) a connecting means for operatively connecting said body to said gauge;
(c) a transfer rod mounted for limited longitudinal movement in said body and drivingly connected at one end to said member;
(d) a bore-engaging sensing member movably mounted to the distal end of said body and drivingly connected to the other end of said rod;
(e) an adjustable bore-engaging element mounted to the distal end of said body on the opposite side of said head in diametrical alignment with said sensing member;
(f) said body being formed with a tapped hole coaxial with said alignment and a threaded stem disposed in said hole, said element mounted on the outer end thereof whereby rotation of said stem will selectively extend or retract said element diametrically to and away from said body and said sensing member;
(g) a measurement scale located lengthwise along said stem for visually indicating the extension of said stem from said hole;
(h) centralizing means connected to said body for engaging the walls of said bore and positioning said sensing member and said element along the diameter of said bore;
(i) said centralizing means including a U-shaped arm having a pair of parallel legs and a cross portion at one end thereof, pivot means connecting the other end of said legs to said body with said legs extending generally parallel to said rod and along opposite sides of said body and with said cross portion disposed proximate the distal end of said body, spring means between said arm and said body urging said one end of said arm away from said bore engaging element;
(j) said arm formed with a groove in each leg thereof at said one end and extending transversely of said legs in alignment with one another, a centralizing ball mounted for limited transverse movement in each of said grooves, each of said centralizing balls having a portion thereof extending outwardly of its respective groove to simultaneously bear against said body and said bore when said head is within said bore; and
(k) variable stop means operatively connected to said head for limiting the movement of said arm about said pivot means, said variable stop means including a rotatable cam.

6. A head for a bore gauge having a movable member therein adapted to produce an indication of measurement corresponding to the extent of displacement of said member, said head comprising:
(a) a body;
(b) connecting means for operatively connecting said body to said gauge;
(c) a transfer rod mounted for limited longitudinal movement in said body and drivingly connected at one end to said member;
(d) a bore-engaging sensing member movably and resiliently mounted to the distal end of said body and at one side thereof and drivingly connected to the other end of said rod;
(e) said body formed with a tapped hole in the distal end thereof in diametrical alignment with said sensing member, a threaded stem mounted in said hole for selective extension and retraction thereof, a bore-engaging contact on the outer end of said stem and a graduated scale lengthwise along said stem;
(f) a centralizing member movably mounted to said body;
(g) spring means connected between said member and said body urging said member away from said base engaging contact along a path perpendicular to said rod;
(i) a centralizing ball mounted for limited transverse movement in each of said grooves, each of said centralizing balls having a portion thereof extending outwardly of the respective groove to simultaneously bear against said body and said bore when said head is within said bore;
(j) said other end of said transfer rod formed with a diagonally extending V groove, said sensing member being pivotally mounted to said body and including a spherical portion seated in said groove whereby any pivotal movement of said sensing member is converted to a linear movement of said rod; and
(k) a support member mounted to said body transversely of said rod and engaging said rod along one side thereof adjacent said other end and opposite said groove to provide sliding support for said rod.

7. A head according to claim 6 wherein said rod is formed with a generally flat face along said one side, said face being formed with a longitudinal groove and a pair of spaced parallel narrow longitudinal ribs slidably engaging said support member.

8. A head according to claim 6 including a leaf spring connecting said sensing member to said body, said spring connecting said sensing member to said body, said leaf spring extending generally parallel to said rod and in position to deflect to and away from said rod, said body formed with a cavity substantially enclosing said leaf spring and said sensing member and screws connecting one end of said leaf spring to said body and the other end to said sensing member, said screws being formed with heads and oriented with respect to said body such that said heads are oriented towards said cavity and accessible only form within said cavity.

9. A head according to claim 8 wherein said body is formed with a cavity substantially enclosing said leaf spring and said sensing member and screws connecting one end of said leaf spring to said body and the other end to said sensing member, said screws being formed with heads and oriented with respect to said body such that said heads are oriented towards said cavity and accessible only from within said cavity.

* * * * *